(12) United States Patent
Bielby et al.

(10) Patent No.: US 12,292,843 B2
(45) Date of Patent: May 6, 2025

(54) TRANSFERRING DATA TO A MEMORY DEVICE BASED ON IMPORTANCE

(71) Applicant: Micron Technology, Inc., Boise, ID (US)

(72) Inventors: Robert Bielby, Placerville, CA (US); Junichi Sato, Yokohama (JP)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/470,144

(22) Filed: Sep. 19, 2023

(65) Prior Publication Data

US 2024/0095200 A1 Mar. 21, 2024

Related U.S. Application Data

(60) Provisional application No. 63/408,371, filed on Sep. 20, 2022.

(51) Int. Cl.
*G06F 13/18* (2006.01)
*G06F 13/16* (2006.01)
*G06F 13/42* (2006.01)

(52) U.S. Cl.
CPC .......... *G06F 13/18* (2013.01); *G06F 13/1626* (2013.01); *G06F 13/4221* (2013.01)

(58) Field of Classification Search
CPC .. G06F 13/18; G06F 13/1626; G06F 13/4221; G06F 13/1605; G06F 3/0685;
(Continued)

(56) References Cited

U.S. PATENT DOCUMENTS

2015/0178101 A1* 6/2015 Krishnaswamy ... G06F 9/44505
713/100
2017/0371566 A1* 12/2017 Zhou ................... G06F 11/3452
(Continued)

OTHER PUBLICATIONS

Zhan, J., Yang, J., Jiang, W., Sun, Y., & Li, Y. (2019). Vehicle data management with specific wear-levelling and fault tolerance for hybrid DRAM-NVM memory. Journal of Systems Architecture, 98, 259-270.*

(Continued)

*Primary Examiner* — Tracy A Warren
(74) *Attorney, Agent, or Firm* — Brooks, Cameron & Huebsch, PLLC

(57) ABSTRACT

Systems, apparatuses, and methods related to transferring data to a memory device based on importance are described. A memory apparatus includes a first memory device, a second memory device having a lower write latency than the first memory device, and a controller coupled to the first memory device and second memory device via a compute express link (CXL) interface. The controller is configured to assign an importance level to a write request based on data associated with the write request, a hierarchy of importance levels for different data types, and the second memory device having a lower write latency than the first memory device. The controller is further configured to transfer the data to the first memory device in response to the assigned importance level having a first value and transfer the data to the second memory device in response to the assigned importance level having a second value.

16 Claims, 4 Drawing Sheets

(58) Field of Classification Search
CPC ...... G06F 3/0613; G06F 3/0611; G06F 3/061; G06F 3/0635; G06F 3/0655; G06F 3/058
See application file for complete search history.

(56) References Cited

U.S. PATENT DOCUMENTS

| | | | |
|---|---|---|---|
| 2020/0192571 A1* | 6/2020 | Thrane | G06F 3/0685 |
| 2021/0103404 A1* | 4/2021 | Hosseinimakarem | G06F 3/0688 |
| 2021/0132816 A1* | 5/2021 | Jo | G06F 12/0284 |
| 2024/0028209 A1* | 1/2024 | Berke | G06F 3/0685 |
| 2024/0070065 A1* | 2/2024 | Hoang | G06F 12/0292 |

OTHER PUBLICATIONS

Yang, J., Zhan, J., Zhang, Y., Jiang, W., Li, L., Zhu, L., & Tang, X. (Aug. 2016). Data management for automotive ECUs based on hybrid RAM-NVM main memory. In 2016 13th International Conference on Embedded Software and Systems (ICESS) (pp. 74-79). IEEE.*

Pang, L., Alazzawe, A., Ray, M., Kant, K., & Swift, J. Just-in-time Intelligent Tiering for Emerging Storage Systems.*

* cited by examiner

TRANSFERRING DATA TO A MEMORY DEVICE BASED ON IMPORTANCE

PRIORITY INFORMATION

This application claims the benefit of U.S. Provisional Application No. 63/408,371, filed Sep. 20, 2022, the contents of which are incorporated herein by reference.

TECHNICAL FIELD

The present disclosure relates generally to semiconductor memory and methods, and more particularly, to apparatuses, systems, and methods for transferring data to a memory device based on importance.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

Vehicles are becoming more dependent upon memory sub-systems to provide storage for components that were previously mechanical, independent, or non-existent. A vehicle can include a computing system, which can be a host for a memory sub-system. The computing system can run applications that provide component functionality. The vehicle may be driver operated, driver-less (autonomous), and/or partially autonomous. The memory device can be used heavily by the computing system in a vehicle.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
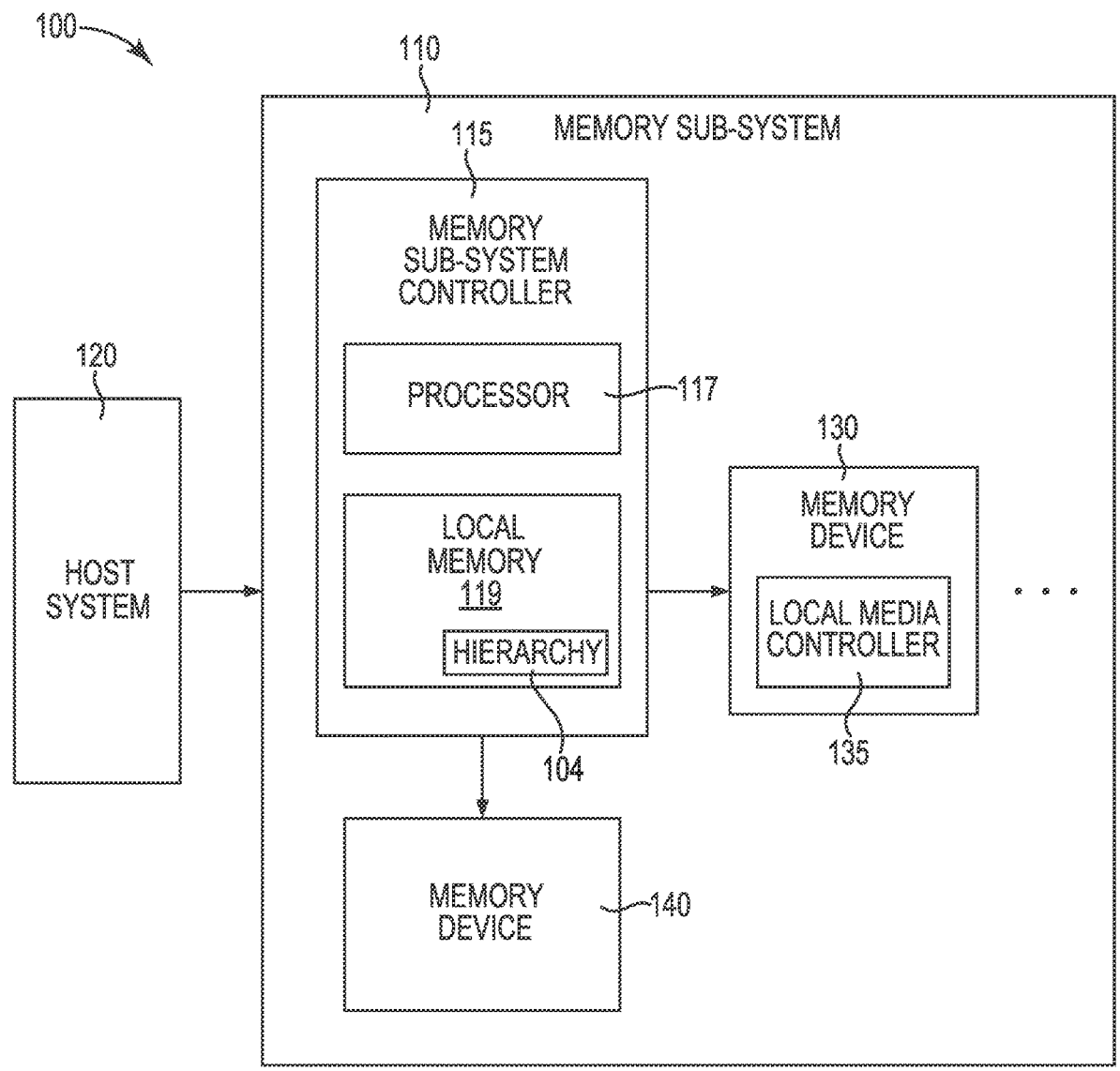
FIG. 1 is an example computing system that includes a memory sub-system in accordance with some embodiments of the present disclosure.

Aspects of the present disclosure are directed to transferring data to a memory device based on importance. An embodiment includes a memory apparatus comprising a first memory device, a second memory device having a lower write latency than the first memory device, and a controller coupled to the first memory device and the second memory device via a Compute Express Link (CXL) interface. The controller is configured to assign an importance level to a write request based on data associated with the write request, a hierarchy of importance levels for different data types, and the second memory device having a lower write latency than the first memory device. The controller can be further configured to transfer the data to the first memory device in response to the assigned importance level having a first value and transfer the data to the second memory device in response to the assigned importance level having a second value.

The first and/or second memory devices may be a non-volatile memory device, such as not-and (NAND) type flash memory. NAND type flash memory includes, for example, two-dimensional NAND (2D NAND) and three-dimensional NAND (3D NAND). Non-volatile memory devices can include one or more arrays of memory cells. The memory cells can be operated as single level cells (SLC) to store one bit per cell. The memory cells can be operated as multi-level cells (MLCs) to store two bits per cell, triple level cells (TLCs) to store three bits per cell, quad-level cells (QLCs) to store four bits per cell, and penta-level cells (PLCs) to store five bits per cell, among other examples including storing fractional bits per cell.

The first and/or second memory devices may be volatile memory devices, such as random access memory (RAM), such as dynamic random access memory (DRAM), synchronous dynamic random access memory (SDRAM), and resistive DRAM (RDRAM).

The first and/or second memory devices may be three-dimensional integrated circuit (3D IC) is a metal-oxide semiconductor (MOS) IC manufactured by stacking semiconductor wafers or dies and interconnecting them vertically using, for example, through-silicon vias (TSVs) or metal connections, to function as a single device to achieve performance improvements at reduced power and smaller footprint than conventional two-dimensional processes. Examples of 3D ICs include hybrid memory cube (HMC) and high bandwidth memory (HBM), among others.

Computing systems such as personal computers, laptops, tablets, phablets, smartphones, Internet-of-Things (IoT) enabled devices, etc., may include one more memory resources to store data and/or instructions associated with the computing system. As used herein, "IoT enabled devices" include physical devices, vehicles, home appliances, and other devices embedded with electronics, software, sensors, actuators, and/or network connectivity which enables such objects to connect and exchange data. Examples of IoT enabled devices include wearable technologies, smart home devices, intelligent shopping systems, and monitoring devices, among other cyber-physical systems. In addition, computing systems may include one or more processing resources to execute system software such as an operating system to provide common services for applications running on the computing system. Examples of operating systems include Linux®, Unix®, Windows®, etc.

During operation, the computing system may execute instructions (e.g., commands) such as firmware, computer code, meta-code, framework files, etc. to provide functionality to the computing system. At least some of these commands may be considered more important than other commands. In previous approaches, commands in a memory system would be transferred to one of multiple memory devices in the memory system regardless of the importance of the commands. This approach could lead to commands that are considered important commands being executed slower than commands that are considered unimportant commands since the latency of a memory device does not correspond to an importance of the command when deciding which memory device to transfer the command.

Aspects of the present disclosure address the above and other deficiencies by transferring data to one of multiple memory devices in a memory system based on the data type, the importance levels for different data types, and a difference in write latency between the multiple memory devices. The data can be assigned an importance before the data is sent to a memory device. Once the data is assigned an importance, the data can be sent to one of a plurality of memory devices based on, at least, an access rate or a latency of each memory device.

The figures herein follow a numbering convention in which the first digit or digits correspond to the drawing figure number and the remaining digits identify an element or component in the drawing. Similar elements or components between different figures may be identified by the use of similar digits. For example, 120 may reference element "20" in FIG. 1, and a similar element may be referenced as 220 in FIG. 2. Analogous elements within a figure may be referenced with a hyphen and extra numeral or letter. Such analogous elements may be generally referenced without the hyphen and extra numeral or letter. For example, elements 232-1, 232-2, . . . , 232-N in FIG. 2 may be collectively referenced as 232. As used herein, the designator "N," particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of a non-volatile dual in-line memory module (NVDIMM).

The computing system 100 can be a computing device such as a desktop computer, laptop computer, network server, mobile device, a vehicle (e.g., airplane, drone, train, automobile, or other conveyance), IoT enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, the term "coupled to" or "coupled with" can refer to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 can use the memory sub-system 110, for example, to write data to the memory sub-system 110 and read data from the memory sub-system 110.

The host system 120 can be coupled to the memory sub-system 110 via an interface (e.g., a physical host interface). Examples of an interface can include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), Universal Serial Bus (USB), or any other interface. The interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The interface can provide a way for passing control, address, data, and other signals between the memory sub-system 110 and the host system 120. FIG. 1 illustrates a memory sub-system 110 as an example. In general, the host system 120 can access multiple memory sub-systems 110 via a same communication connection, multiple separate communication connections, and/or a combination of communication connections.

As shown in FIG. 1, the local memory 119 can include hierarchy circuitry 104 to assign a hierarchy to data before the data is transferred to the memory device 130 and/or memory device 140. In some embodiments, the memory sub-system controller 115 can be configured to receive data comprising a hierarchy and store the data comprising the hierarchy. As used herein, the term "hierarchy" refers to a level of importance for data relative to other data. For example, a hierarchy can include, at least, a first type of data that has a first importance level and a second type of data that has a second importance level.

In some embodiments, a memory apparatus 100 can comprise an SSD. An SSD can be included in a vehicle (e.g., vehicle 226 in FIG. 2). The controller 115 can be configured to receive the data comprising the hierarchy prior to the SSD being in use by a vehicle in which it is or will be installed. Further, the controller 115 can be configured to prevent an end-user from altering the data comprising the hierarchy. Alternatively, in some embodiments, the controller can be configured to allow an end-user to alter the data comprising the hierarchy. The controller 115 can be configured to receive an update to the data comprising the hierarchy after the SSD is in use by the vehicle in which it is installed via an over-the-air update.

In some embodiments, different data types can correspond to different vehicular functions that use the SSD for storage. The controller 115 can be configured to track a respective memory access rate for each data type and create the hierarchy based on the respective memory access rates. In some embodiments, the apparatus 100 can comprise a third memory device (not pictured) having a lower write latency than the second memory device 140, wherein the controller 115 can be configured to transfer the data to the third memory device in response to the assigned importance level having a third value. As used herein, the term "write latency" refers to a delay before a transfer of data begins following an instruction for the transfer of the data.

In some embodiments the controller 115 can be configured to assign the importance level to a write request in response to a quantity of pending write requests exceeding a threshold quantity or in response to a threshold bandwidth of the memory apparatus being executed. The controller 115 can further be configured to process write requests without assigning an importance thereto in response to the quantity of pending write requests being below threshold quantity or in response to the bandwidth of the memory apparatus being within the threshold bandwidth.

The memory devices 130, 140 can include any combination of the different types of non-volatile memory devices and/or volatile memory devices. The volatile memory devices (e.g., memory device 140) can be, but are not limited to, RAM, such as DRAM, SDRAM, and RDRAM.

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, SLCs can store one bit per cell. Other types of memory cells, such as MLCs, TLCs, QLCs, and PLCs can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type memory (e.g., 2D NAND, 3D NAND) are described, the memory device 130 can be based on any other type of non-volatile memory or storage device, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g. processor 117), configured to execute instructions stored in a local memory 119. In the illustrated example, the local memory 119 of the memory sub-system controller 115 can include an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include a host interface (not pictured) circuitry to communicate with the host system 120 via a physical host interface (not pictured). The host interface circuitry can convert the commands received from the host system 120 into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

Figure 2:
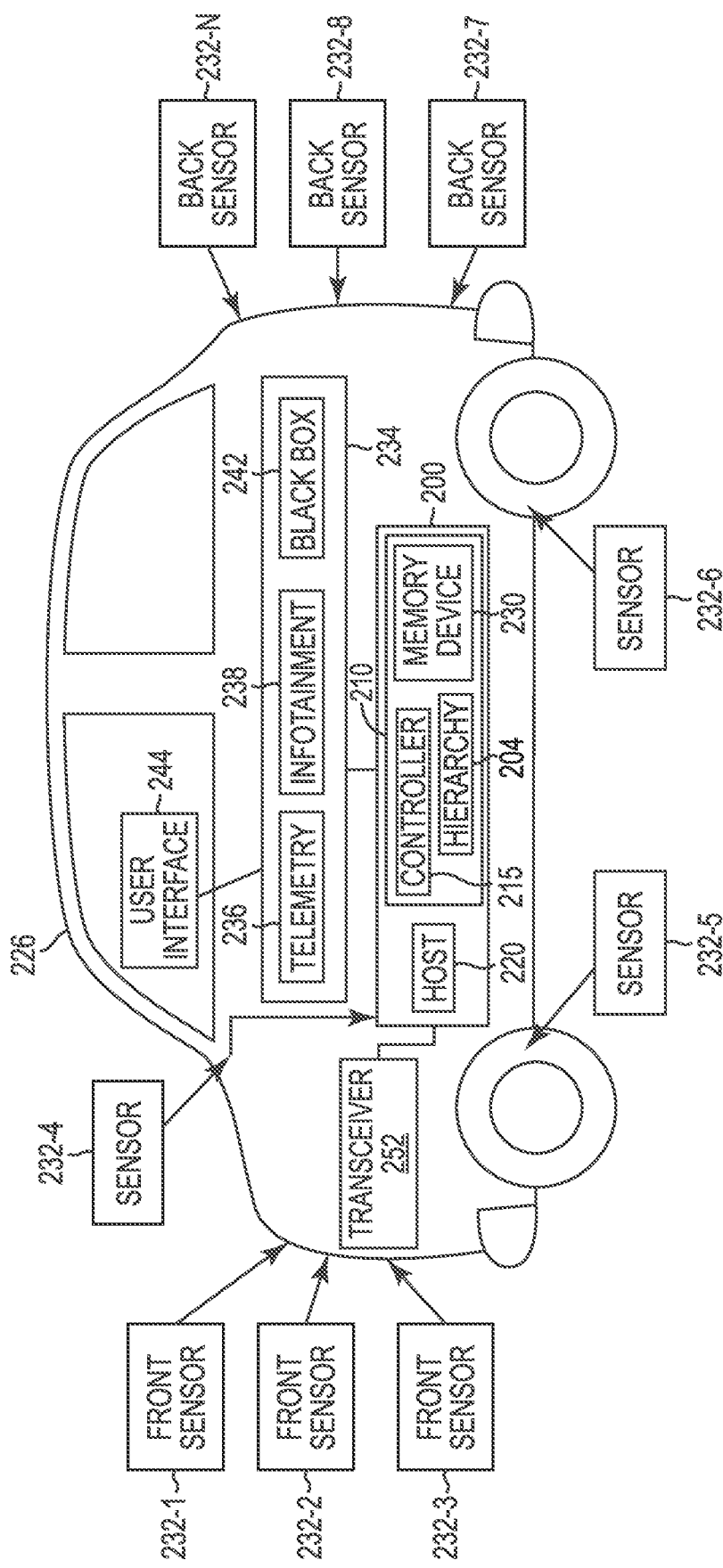
FIG. 2 is an example of a system including a computing system in a vehicle in accordance with some embodiments of the present disclosure.

FIG. 2 illustrates an example of a system including a computing system 200 in a vehicle 226 in accordance with some embodiments of the present disclosure. The computing system 200 can include a memory sub-system 210, which is illustrated as including a controller 215, hierarchy circuitry 204, and non-volatile memory device 230 for simplicity but is analogous to the memory sub-system 110 illustrated in FIG. 1.

The computing system 200, and thus the host 220, can be coupled to a number of sensors 232 either directly, as illustrated for the sensor 232-4 or via a transceiver 252 as illustrated for the sensors 232-1, 232-2, 232-3, 232-5, 232-6, 232-7, 232-8, . . . , 232-N. The transceiver 252 is able to receive data from the sensors 232 wirelessly, such as by radio frequency communication. In at least one embodiment, each of the sensors 232 can communicate with the computing system 200 wirelessly via the transceiver 252. In at least one embodiment, each of the sensors 232 is connected directly to the computing system 200 (e.g., via wires or optical cables).

The vehicle 226 can be a car (e.g., sedan, van, truck, etc.), a connected vehicle (e.g., a vehicle that has a computing capability to communicate with an external server), an autonomous vehicle (e.g., a vehicle with self-automation capabilities such as self-driving), a drone, a plane, a ship, and/or anything used for transporting people and/or goods. The sensors 232 are illustrated in FIG. 2 as including example attributes. For example, sensors 232-1, 232-2, and 232-3 are cameras collecting data from the front of the vehicle 226. Sensors 232-4, 232-5, and 232-6 are microphone sensors collecting data from the from the front, middle, and back of the vehicle 226. The sensors 232-7, 232-8, and 232-N are cameras collecting data from the back of the vehicle 226. As another example, the sensors 232-5, 232-6 are tire pressure sensors. As another example, the sensor 232-4 is a navigation sensor, such as a global positioning system (GPS) receiver. As another example, the sensor 232-6 is a speedometer. As another example, the sensor 232-4 represents a number of engine sensors such as a temperature sensor, a pressure sensor, a voltmeter, an ammeter, a tachometer, a fuel gauge, etc. As another example, the sensor 232-4 represents a camera. Video data can be received from any of the sensors 232 associated with the vehicle 226 comprising cameras. In at least one embodiment, the host 220 can compress the video data before providing the video data to the memory sub-system 210.

The host 220 can execute instructions to provide an overall control system and/or operating system for the vehicle 226. The host 220 can be a controller designed to assist in automation endeavors of the vehicle 226. For example, the host 220 can be an advanced driver assistance system controller (ADAS). An ADAS can monitor data to prevent accidents and provide warning of potentially unsafe situations. For example, the ADAS can monitor sensors in the vehicle 226 and take control of vehicle 226 operations to avoid accident or injury (e.g., to avoid accidents in the case of an incapacitated user of a vehicle). The host 220 may need to act and make decisions quickly to avoid accidents. The memory sub-system 210 can store reference data in the non-volatile memory device 230 such that data from the sensors 232 can be compared to the reference data by the host 220 in order to make quick decisions.

The host 220 can write data received from one or more sensors 232 and store the data (e.g., in association with a black box application 242 for the vehicle). The black box application 242 may also be referred to as an accident data recorder. With the advent of autonomous vehicles, some autonomous driving requires real time buffering of telemetric data such as video cameras, RADAR, LIDAR, ultrasonic and other sensors necessary to playback the sequences preceding an accident. Upon an event, such as, but not limited to, an accident, a quantity (e.g., thirty seconds) of playback time immediately preceding an event needs to be captured to determine the cause of an incident. A playback may be referred to as a "snapshot." The application that controls storage of such information is referred to herein as a black box 242. A black box 242 may need to store at least a few, most recent snapshots.

The host 220 can execute instructions to provide a set of applications 234 for the vehicle 226 including telemetry 236, infotainment 238, and a black box 242. The telemetry application 236 can provide information displayable on a user interface 244 that may be associated with the instrumentation and/or dashboard of a vehicle 226. An example of such telemetric information is the speed at which the vehicle 226 is traveling (e.g., based at least in part on data from a sensor 232). The infotainment application 238 can include information and/or entertainment for a user of the vehicle 226 displayable or interfaced via the user interface 244. Examples of such information and/or entertainment include music, movies, GPS information such as a moving map, etc. The memory sub-system 210 can provide storage for any of the set of applications 234. The set of applications 234 can be virtualized with backing storage provided by the memory sub-system 210.

In some embodiments, the controller 215 can be configured to assign an importance level to data corresponding to instructions (e.g., a command) received from the host 220 and transfer the data to the first memory device 230 or the second memory device (e.g., memory device 140 in FIG. 1). The first memory device 230 can be a first type of memory device (e.g., a non-volatile memory device) and the second memory device can be a second type of memory device (e.g., a volatile memory device). In some embodiments, the data received from the host 220 can correspond to a function (e.g., the operation) of the vehicle 226. For example, the data can correspond to a safety function of the vehicle 226 or a non-safety function of the vehicle 226. As used herein, a "safety function" refers to equipment and/or technology for increasing the safety and security of a vehicle and/or its passengers. For example, safety functions of the vehicle 226 can include, but are not limited to, deploying airbags and activating an antilock braking system. Non-safety functions can include, but are not limited to, operating the infotainment application 238. In some embodiments, the data corresponding to a command received from the host 220 can have a higher importance level when the data corresponds to a safety function of the vehicle 226 than when the data corresponds to a non-safety function of the vehicle 226. The importance level of the data can be assigned to the data by the hierarchy circuitry 204. In some embodiments, the command can be sent in response to an event detected by sensors 232 of the vehicle 226. Further, in some embodiments, the command can be sent in response to an input from a user of the vehicle 226.

Figure 3:
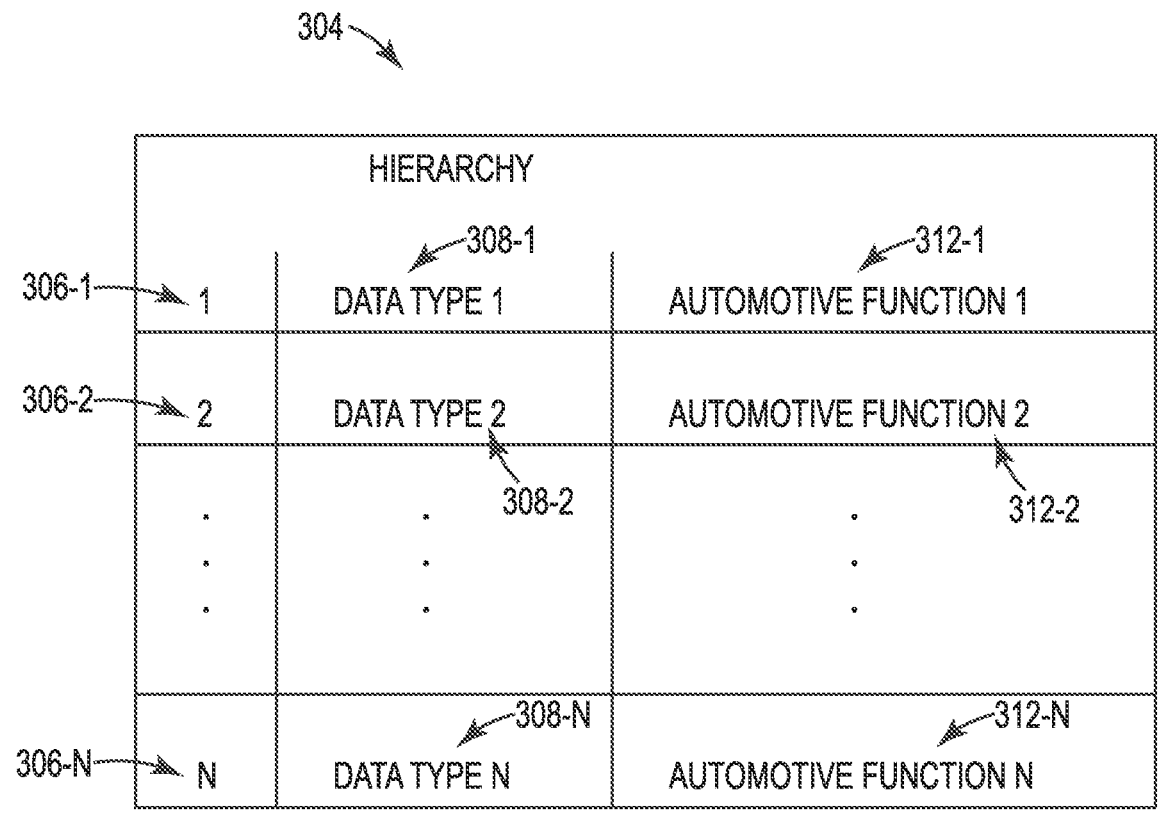
FIG. 3 is an example of hierarchy circuitry in accordance with some embodiments of the present disclosure.

FIG. 3 is an example of hierarchy circuitry 304 in accordance with some embodiments of the present disclosure. Hierarchy circuitry 304 can include an importance level 306-1, 306-2, . . . , 306-N (individually or collectively referred to as hierarchy circuitry 304), data types 308-1, 308-2, . . . , 308-N (individually or collectively referred to as data types 308), and vehicular functions 312-1, 312-2, . . . , 312-N (individually or collectively referred to as vehicular functions 312).

The hierarchy circuitry 304 can assign an importance level 306 to different data types 308. For example, a first data type 308-1 can have an importance level 306-1 of 1 and second data type 308-2 can have an importance level 306-2 of 2. The data type 308 can correspond to a vehicular function 312. For example, the first data type 308-1 can correspond to a first vehicular function 312-1 and the second data type 308-2 can correspond to a second vehicular function 312-2. In some embodiments, an importance level 306-1 of 1 can indicate a greater importance level 306 than an importance level 306 of 2. In those embodiments, the first data type 308-1 would have a higher importance level 306 than the second data type 308-2 in FIG. 3. Therefore, data of the first data type 308-1 could be transferred to a memory device (e.g., memory device 130 and/or memory device 140 in FIG. 1) before data of the second data type 308-2.

In some embodiments, the importance levels 306 for the hierarchy circuitry 304 can be assigned via non-maskable interrupt (NMI) circuitry. As used herein "NMI circuitry" refers to circuitry configured to send a signal to a processor (e.g., controller 215 in FIG. 2) that prioritizes certain data. NMI circuitry can interrupt the transfer of data to transfer different data that has a higher importance level. In some embodiments, the hierarchy circuitry 304 can be NMI circuitry. The NMI circuitry can assign an importance level 306 to data by assigning an NMI level to the data. The importance level 306 for data can increase as the NMI level assigned to the data decreases. For example, the NMI circuitry can assign an NMI level of 1 to a first data type 308-1 and assign an NMI level of 2 to a second data type 308-2. Since the first data type 308-1 has a lower NMI level than the second data type 308-2, the first data type 308-1 can have a higher importance level than the second data type 308-2.

Figure 4:
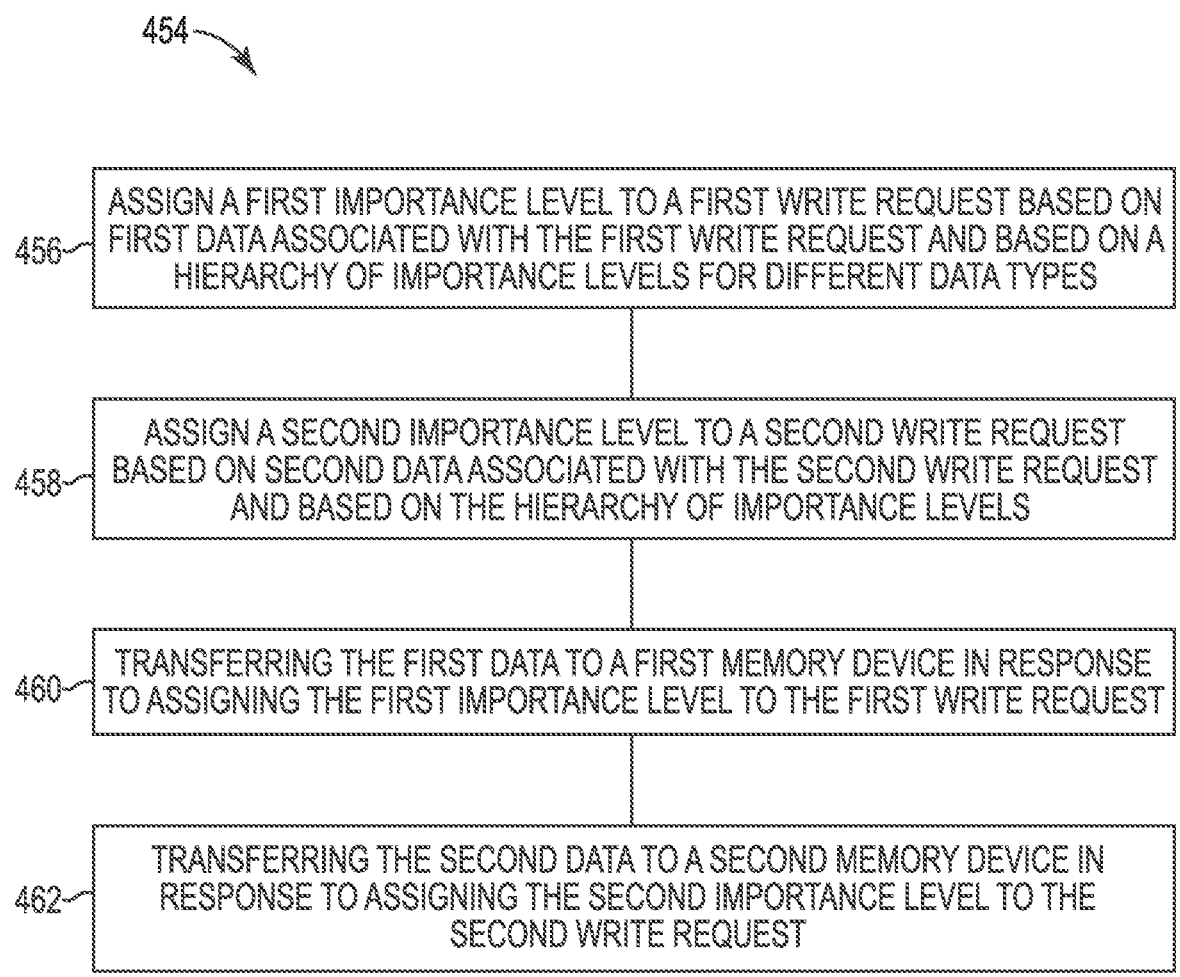
FIG. 4 is a flow diagram of an example method for transferring data to a memory device based on importance in accordance with some embodiments of the present disclosure.

FIG. 4 is a flow diagram of an example method 454 for transferring data to a memory device based on importance in accordance with some embodiments of the present disclosure. The method can be performed by processing logic that can include hardware (e.g., a processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 456, the method 454 can include assigning a first importance level to a first write request based on the first data associated with the first write request and based on a hierarchy of importance levels for different data types. In some embodiments, assigning the first importance level to the first write request is further based on the first data being of a first data type. Further, assigning the first importance level to the first write request and assigning the second importance level to the second write request is further based on the first memory device having a lower read latency than the second memory device.

At block 458, the method 454 can include assigning a second importance level to a second write request based on the second data associated with the second write request and based on the hierarchy of importance levels. In some embodiments, assigning the second importance level to the second write request is further based on the second data being of a second data type. Further, assigning the first importance level to the first write request and assigning the second importance level to the second write request is further based on the first memory device having a lower write latency than the second memory device.

At block 460, the method 454 can include transferring the first data to a first memory device in response to assigning the first importance level to the first write request. The first write request can be executed on the first memory device with the first write latency.

At block 462, the method 454 can include transferring the second data to a second memory device in response to assigning the second importance level to the second write request. The second write request can be executed on the second memory device with a second write latency, wherein the second write latency is lower than the first write latency.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a machine-readable storage medium, such as, but not limited to, types of disks, semiconductor-based memory, magnetic or optical cards, or other types of media suitable for storing electronic instructions.

The present disclosure can be provided as a computer program product, or software, that can include a machine-readable medium having stored thereon instructions, which can be used to program a computer system (or other electronic devices) to perform a process according to the present disclosure. A machine-readable medium includes a mechanism for storing information in a form readable by a machine (e.g., a computer).

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory apparatus, comprising:
   a first memory device;
   a second memory device having a lower write latency than the first memory device;
   a solid state drive; and
   a controller coupled to the first memory device and the second memory device via a compute express link (CXL) interface;
   wherein the controller is configured to:
      receive data comprising a hierarchy of importance levels for different data types and store the data comprising the hierarchy of importance levels for the different data types, wherein the controller is configured to receive the data comprising the hierarchy of importance levels for the different data types prior to the solid state drive being in use by a vehicle in which it is installed or will be installed;
      assign an importance level to a write request based on:
         data associated with the write request;
         the hierarchy of importance levels for the different data types; and
         the second memory device having the lower write latency than the first memory device;
      transfer the data to the first memory device in response to the assigned importance level having a first value; and
      transfer the data to the second memory device in response to the assigned importance level having a second value.

2. The apparatus of claim 1, wherein the controller is configured to prevent an end-user from altering the data comprising the hierarchy.

3. The apparatus of claim 1, wherein the memory apparatus comprises the solid state drive; and
   wherein the different data types correspond to different vehicular functions that use the solid state drive for storage.

4. The apparatus of claim 1, further comprising a third memory device having a lower write latency than the second memory device;
   wherein the controller is configured to transfer the data to the third memory device in response to the assigned importance level having a third value.

5. The apparatus of claim 1, wherein the controller is configured to assign the importance level to a write request in response to a quantity of pending write requests exceeding a threshold quantity or in response to a threshold bandwidth of the memory apparatus being exceeded.

6. A memory apparatus, comprising:
   a first memory device;
   a second memory device having a lower read latency than the first memory device; and
   a controller coupled to the first memory device and the second memory device via a compute express link (CXL) interface;
   wherein the controller is configured to:
      assign an importance level to a write request based on:
         data associated with the write request;
         a hierarchy of importance levels for different data types; and
         the second memory device having the lower read latency than the first memory device;
      transfer the data to the first memory device in response to the assigned importance level having a first value;
      transfer the data to the second memory device in response to the assigned importance level having a second value;
      track a respective memory access rate for each different data type; and
      create the hierarchy based on the respective access rates.

7. The apparatus of claim 6, wherein the memory apparatus comprises a solid state drive; and
   wherein the different data types correspond to different vehicular functions that use the solid state drive for storage.

8. The apparatus of claim 6, further comprising a third memory device having a lower read latency than the second memory device;
   wherein the controller is configured to transfer the data to the third memory device in response to the assigned importance level having a third value.

9. The apparatus of claim 6, wherein the controller is configured to receive data comprising the hierarchy and store the data comprising the hierarchy.

10. A method, comprising:
    assigning a first importance level to a first write request based on first data associated with the first write request and based on a hierarchy of importance levels for different data types;
    assigning a second importance level to a second write request based on second data associated with the second write request and based on the hierarchy of importance levels, wherein assigning the first importance level to the first write request and assigning the second importance level to the second write request are further based on a first memory device having a lower write latency than a second memory device;
    transferring the first data to the first memory device in response to assigning the first importance level to the first write request; and
    transferring the second data to the second memory device in response to assigning the second importance level to the second write request.

11. The method of claim 10, further comprising executing the first write request on the first memory device with a first write latency; and
    executing the second write request on the second memory device with a second write latency, wherein the second write latency is lower than the first write latency.

12. The method of claim 11, wherein assigning the first importance level to the first write request is further based on the first data being of a first data type; and wherein assigning the second importance level to the second write request is further based on the second data being of a second data type.

13. A memory apparatus, comprising:
a first memory device;
a second memory device having a lower write latency than the first memory device;
a solid state drive; and
a controller coupled to the first memory device and the second memory device via a compute express link (CXL) interface;
wherein the controller is configured to:
receive data comprising a hierarchy of importance levels for different data types and store the data comprising the hierarchy of importance levels for the different data types;
assign an importance level to a write request based on:
data associated with the write request;
the hierarchy of importance levels for the different data types; and
the second memory device having the lower write latency than the first memory device;
transfer the data to the first memory device in response to the assigned importance level having a first value;
transfer the data to the second memory device in response to the assigned importance level having a second value; and
receive an update to the data comprising the hierarchy of importance levels for the different data types after the solid state drive is in use by a vehicle in which it is installed via an over-the-air update.

14. A memory apparatus, comprising:
a first memory device;
a second memory device having a lower write latency than the first memory device; and
a controller coupled to the first memory device and the second memory device via a compute express link (CXL) interface;
wherein the controller is configured to:
assign an importance level to a write request based on:
data associated with the write request;
a hierarchy of importance levels for different data types; and
the second memory device having the lower write latency than the first memory device;
transfer the data to the first memory device in response to the assigned importance level having a first value;
transfer the data to the second memory device in response to the assigned importance level having a second value;
track a respective memory access rate for each different data type; and
create the hierarchy based on respective memory access rates.

15. A memory apparatus, comprising:
a first memory device;
a second memory device having a lower write latency than the first memory device; and
a controller coupled to the first memory device and the second memory device via a compute express link (CXL) interface;
wherein the controller is configured to:
assign an importance level to a write request based on:
data associated with the write request;
a hierarchy of importance levels for different data types; and
the second memory device having the lower write latency than the first memory device;
transfer the data to the first memory device in response to the assigned importance level having a first value;
transfer the data to the second memory device in response to the assigned importance level having a second value; and
process write requests without assigning an importance thereto in response to a quantity of pending write requests being below a threshold quantity or in response to a bandwidth of the memory apparatus being within a threshold bandwidth.

16. A method, comprising:
assigning a first importance level to a first write request based on first data associated with the first write request and based on a hierarchy of importance levels for different data types;
assigning a second importance level to a second write request based on second data associated with the second write request and based on the hierarchy of importance levels, wherein assigning the first importance level to the first write request and assigning the second importance level to the second write request are further based on a first memory device having a lower read latency than a second memory device;
transferring the first data to the first memory device in response to assigning the first importance level to the first write request; and
transferring the second data to the second memory device in response to assigning the second importance level to the second write request.

* * * * *